United States Patent
Komara et al.

[11] Patent Number: 6,088,570
[45] Date of Patent: Jul. 11, 2000

[54] METHOD AND APPARATUS EMPLOYING DELAY ELEMENTS IN MULTIPLE DIVERSITY PATHS OF A WIRELESS SYSTEM REPEATER TRANSLATOR TO ALLOW FOR SELECTIVE DIVERSITY AND AUTOMATIC LEVEL CONTROL IN A TIME-DIVISION MULTIPLE ACCESS SYSTEM

[75] Inventors: Michael A. Komara; Thomas R. Schmutz, both of Indialantic; Jeffrey W. Smith, Palm Bay, all of Fla.; Stephen J. Foley, Santa Clara, Calif.

[73] Assignee: Airnet Communications Corporation, Melbourne, Fla.

[21] Appl. No.: 09/198,485

[22] Filed: Nov. 24, 1998

Related U.S. Application Data

[60] Provisional application No. 60/066,480, Nov. 26, 1997.

[51] Int. Cl.[7] .................................................. H04B 7/15
[52] U.S. Cl. ..................... 455/11.1; 455/422; 455/101; 455/134; 455/277.1; 370/321; 370/347
[58] Field of Search .................. 455/11.1, 422, 455/501–502, 504, 506, 517, 524, 63, 67.1, 65, 67.3, 561, 101, 132–136, 272, 277.1–278.1, 296; 370/321, 347

[56] References Cited

U.S. PATENT DOCUMENTS

| | | | |
|---|---|---|---|
| 4,759,051 | 7/1988 | Han | 455/436 |
| 5,127,025 | 6/1992 | Okanoue | 455/135 |
| 5,152,002 | 9/1992 | Leslie et al. | 455/422 |
| 5,544,171 | 8/1996 | Godecker | 455/561 |
| 5,592,480 | 1/1997 | Carney et al. | 455/561 |
| 5,649,292 | 7/1997 | Doner | 455/447 |
| 5,924,022 | 7/1999 | Beasley et al. | 455/11.1 |

*Primary Examiner*—Doris H. To
*Attorney, Agent, or Firm*—Quarles & Brady LLP

[57] ABSTRACT

In a conventional Time Division Multiple Access (TDMA) wireless system, the specified distance between a mobile unit and the base transceiver system (BTS) cannot exceed predetermined distances because of time slot synchronization constraints. Furthermore, varying distances between mobile units and the BTS, as well as Rayleigh fading, caused by destructive interference effects between direct and reflected signals, create extreme signal strength variations in the initial uplink signal from the mobile stations. The use of spatially-diverse antennas for receiving uplink signals provides diversity gain and mitigates deep fades. Furthermore, selecting the stronger of the spatially-diverse uplink signals mitigates deep fades and reduces frequency usage in the backhaul frequency band. In this approach to extending TDMA system coverage, in-band translator components are located in the center of remote cells which would normally contain a base transceiver system (BTS). The in-band translators include delay elements to implement slot-by-slot selective spatial diversity and automatic level control in a predictive feedforward fashion. The selective diversity mitigates deep Rayleigh fades, while the dynamic automatic level control drastically reduces the uplink backhaul dynamic range to allow for greater backhaul distances. Predictive feedforward automatic level control also eliminates overload and saturation of the backhaul high power amplifier, normally caused by wide variations in uplink power levels.

7 Claims, 3 Drawing Sheets

METHOD AND APPARATUS EMPLOYING DELAY ELEMENTS IN MULTIPLE DIVERSITY PATHS OF A WIRELESS SYSTEM REPEATER TRANSLATOR TO ALLOW FOR SELECTIVE DIVERSITY AND AUTOMATIC LEVEL CONTROL IN A TIME-DIVISION MULTIPLE ACCESS SYSTEM

This application claims the benefit of U.S. Provisional application Ser. No. 60/066,480, filed Nov. 26, 1997.

FIELD OF THE INVENTION

This invention relates generally to wireless communication systems and in particular to a method and apparatus for employing delay elements in multiple diversity paths of a wireless system repeater translator (remote base station) to allow for selective diversity and automatic level control in a time-division multiple access system.

BACKGROUND OF THE INVENTION

The demand for wireless communication services, such as Cellular Mobile Telephone (CMT), Personal Communication Services (PCS) and the like, typically requires the operators of such systems to serve an increasing number of users. As a result, a type of base station equipment known as a multicarrier broadband Base Transceiver System (BTS) has been developed which is intended to service a relatively large number of active mobile stations in each cell. Such broadband BTS equipment can typically service ninety-six simultaneously active mobile stations, at a significant cost per channel.

When coupled with efficient frequency reuse schemes, such as that described in U.S. Pat. No. 5,649,292 entitled "A Method For Obtaining Times One Frequency Reuse in Communication Systems" issued to John R. Doner and assigned to AirNet Communications Corporation, who is the assignee of the present application, maximum efficiency in densely populated urban environments is obtained. According to that arrangement, each cell is split into six radial sectors and frequencies are assigned to the sectors in such a manner as to provide the ability to reuse each available frequency in every third cell. Although this frequency reuse scheme is highly efficient, it requires at least two complete sets of multicarrier transceiver equipment such as in the form of a broadband base transceiver system (BTS) to be located in each cell. Such a configuration results in dramatically increased hardware installation costs for each cell.

While this equipment is cost effective to deploy when a relatively large number of active mobile stations is expected in each cell, it is not particularly cost effective in most other situations. For example, during an initial system build out phase, a service provider does not actually need to use large numbers of radio channels. It is therefore typically not possible to justify the cost of deploying complex multicarrier broadband transceiver system equipment based only upon the initial number of subscribers. As a result, the investment in broadband multicarrier radio equipment may not be justified until such time as the number of subscribers increases to a point where the channels are busy most of the time. Furthermore, many areas exist where the need for wireless communication systems is considerable, but where signal traffic can be expected to remain low indefinitely (such as in rural freeway locations or large commercial/industrial parks). Because only a few cells at high expected traffic demand locations (such as in a downtown urban location or a freeway intersection) will justify the initial expense of building out a network of high capacity broadband transceiver systems, the service provider is faced with a dilemma. He can build-out the system with less expensive narrowband equipment initially, to provide some level of coverage, and then upgrade to the more efficient equipment as the number of subscribers rapidly increases in the service area. However, the initial investment in narrowband equipment is then lost. Alternatively, a larger up front investment can be made to deploy the high capacity equipment at the beginning, so that once demand increases, the users of the system can be accommodated without receiving busy signals and the like. But this has the disadvantage of carrying the cost of a larger up-front investment.

Further complicating the situation is the fact that regardless of the device used to extend the range of cell sites, any such device with a single uplink receive antenna will suffer from severe Rayleigh fading, or destructive wave interference, of widely varying magnitude, due to the wave cancellation effects of reflected and retransmitted signals.

The use of two spatially diverse antennas for the uplink signal from the mobile station will provide diversity gain and mitigate deep fades since fades will generally occur at a different time for one antenna relative to a spatially separated second antenna. The use of multiple antennas can accompany increased frequency usage in the "backhaul" frequency band employed for communication between the BTS and the cell range extending remote base station device. However, the use of selective diversity will mitigate this effect.

For PCS-1900 and DCS-1800, the uplink signal strength from a mobile station can vary by as much as 80 dBm, typically from −25 dBm to below −105 dBm. For GSM-900, the uplink signal strength can vary by as much as 92 dBm, typically from −13 dBm to below −105 dBm. This large range of signal strength necessarily restricts the distance of successful propagation of the backhaul signal from the range extending remote base station device to the BTS.

Some have proposed various techniques for expanding the service area of a master cell site. For example, the HPT Cell Site Expander product manufactured by 3dbm, Inc., of Camarillo, Calif., consists of a base station translator which samples downlink signal traffic and translates it to a selected offset frequency. The offset carrier is transmitted to an expansion cell site via directional antennas. At the expansion cell site, the carrier is translated back to the original cellular channel and transmitted throughout the expansion cell site coverage area such as via an omnidirectional antenna. In the uplink direction, a cellular signal received by the expansion cell site from a mobile unit is translated and then transmitted back to the base station translator, which in turn translates the signal back to its original carrier frequency.

However, such a device is designed only for use with analog-type cellular systems. A specific problem is encountered when attempting to extend the service area of a base station that uses Time Division Multiple Access (TDMA) signaling. Such a system makes use of a technique in which multiple voice or data channels are provided by dividing the access to each radio carrier frequency into carefully synchronized time slots. In order to properly demodulate a TDMA signal at the base station, a timing advance must be taken into consideration for each radio pulse received from the mobile stations. The timing advance serves to compensate for the differences in signal propagation time since the distance to the base station is different for each mobile station.

A TDMA signal transmitted in the uplink direction must therefore arrive at the Base Transceiver System with proper time alignment. If this is not the case, the signal pulses from the various mobile stations will collide, and it will not be possible for the Base Transceiver System to demodulate the signals properly. As such, it has in most instances been necessary to limit the nominal radius of a TDMA cell so that proper time alignment may be maintained.

An approach to extending the radius of a TDMA cell was disclosed in U.S. Pat. No. 5,544,171, issued to Goedecker and assigned to Alcatel N. V. This technique uses a fixed Base Transceiver System (BTS) that includes both a standard TDMA radio receiver and an additional auxiliary TDMA receiver. The auxiliary TDMA receiver receives and compensates the TDMA radio pulses from mobile stations located outside of the nominal cell radius. In this manner, interference between the TDMA signals received from a mobile station located outside of the nominal cell radius and a mobile station located within the nominal radius is avoided.

Unfortunately, the Goedecker technique is intended for use where both radio transceivers can be located entirely within the base station site. This permits the timing signals for the auxiliary TDMA receiver to be directly connected to the timing signals for the standard TDMA receiver. Thus, it would not be possible to directly apply the Goedecker technique to a remote repeater or translator arrangement, where the auxiliary TDMA receiver would have to be located many miles away from the base station site and such timing signal connection would not be possible.

Furthermore, while the HPT and Goedecker designs can be used to extend the radius of a single cell, they do not appear to suggest how to synchronize TDMA signals received from multiple mobile stations located in multiple cells simultaneously, nor do they suggest any form of random access control channel processing of initial uplink transmissions from mobile stations.

Other techniques for extending the service area of a given cell include, for example, U.S. Pat. No. 4,727,490 issued to Kawano et al. and assigned to Mitsubishi Denki Kabushiki Kaisha. Kawano discloses a mobile telephone system in which a number of repeater stations are installed at the boundary points of hexagonally shaped cells. The repeaters define a small or minor array which is, in effect, superimposed on a major array of conventional base stations installed at the center of the cells. With this arrangement, any signals received in so-called minor service areas by the repeaters are relayed to the nearest base station.

Another technique for cell service range extension was disclosed in U.S. Pat. No. 5,152,002 issued to Leslie et al., and assigned to Orion Industries, Inc., wherein the coverage of a cell is extended by including a number of so-called "boosters" arranged in a serial chain. As a mobile station moves along an elongated area of coverage, it is automatically picked up by an approaching booster and dropped by a receding booster. These boosters, or translators, use highly directive antennas to communicate with one another and thus ultimately via the serial chain with the controlling central site. The boosters may either be used in the mode where the boosted signal is transmitted at the same frequency as it is received or in a mode where the incoming signal is retransmitted at a different translated frequency.

Unfortunately, each of these techniques have their difficulties. In the Kawano method, which uses an array of repeaters co-located with the primary cell sites, the implementation of diversity receivers becomes a problem. Specifically, certain types of cellular communication systems, particularly those that use digital forms of modulation, are susceptible to multi-path fading and other distortion. It is imperative in such systems to deploy diversity antennas at each cell site. This repeater array scheme of Kawano makes implementation of diversity antennas extremely difficult, since each repeater simply forwards its received signal to the base station, and diversity information as represented by the phase of the signal received at the repeater, is thus lost.

The scheme disclosed by Leslie works fine in a situation where the boosters are intended to be arranged in a straight line, such as along a highway, a tunnel, a narrow depression in the terrain such as a ravine or adjacent a riverbed. However, there is no teaching of how to deploy the boosters efficiently in a two-dimensional grid, or to share the available translated frequencies as must be done if the advantages of cell site extension are to be obtained throughout an entire service region, such as a large city.

DESCRIPTION OF THE INVENTION

Objects of the Invention

It is an object of this invention to extend the available range in a cellular communication system beyond that which is normally available with Time Division Multiple Access (TDMA) air interfaces.

Another object is to provide for slot-by-slot selective spatial diversity to eliminate multi-path Rayleigh fading.

A further object is to reduce frequency use in the backhaul frequency band used for communication between a Base Transceiver System and a repeater-translator.

A further object is to provide for automatic level control in a predictive feedforward fashion to reduce uplink backhaul amplitude range, thereby allowing for greater backhaul distances.

Yet another object is to use delay elements within a repeater-translator to implement selective diversity on a slot-by-slot basis.

It is still another object of this invention to use delay elements within a repeater-translator to implement automatic level control.

SUMMARY OF THE INVENTION

Briefly, the invention is based on an architecture for a wireless communication system in which the cells are grouped into clusters. A host cell location is identified within each cluster and a multicarrier broadband Base Transceiver System (BTS) is located at or near the host cell site.

Rather than deploy a complete suite of base station equipment at each remaining cell in the cluster, translating radio transceivers are located in the remote cells. These translating radio transceivers operate in-band, that is, within the frequencies assigned to the service provider.

The in-band translators operate in both an uplink and downlink direction. That is, uplink signals transmitted by a mobile station located in a remote cell are received at the in-band translator, translated to a different carrier frequency, and then transmitted to the host BTS. Likewise, downlink signals transmitted by the host BTS are first received by the in-band translator, translated to a different carrier frequency, and then repeated out to the mobile stations at high power.

The host BTS measures a time delay for each in-band translator channel during a calibration mode. This is accomplished by setting the in-band translator to a loop-back mode whereby the high-power translated downlink signal received from the host BTS is coupled and mixed via frequency translation back to the BTS via the uplink transmit path. A timing test signal in the form of, for example, a random access control channel (RACCH) burst is then transmitted by the host BTS such as would normally be sent by a mobile station. The RACCH burst is received by the in-band translator and looped back to the host BTS. The host BTS then demodulates the looped back signal, and measures the elapsed time interval between the transmission and reception of the loop-back signal at the host BTS. A resulting round-trip time-of-arrival delay estimate as measured in the downlink and uplink path is then calculated and used by the host BTS to compensate for time alignments to be made in the time slots for the downlink and uplink signals during normal operation.

As a result, the time delay limitation on the backhaul distance of the cell site normally associated with Time Division Multiple Access protocols is avoided. Indeed the range of such a system is limited only by the expected attenuation in the radio link. The time delay limitation applies only to the distance of the mobile unit from the range extending repeater-translator remote base station.

In accordance with the invention, the in-band translator continually monitors the time slots and multiframe bursts in the signals transmitted by the BTS. A continuous, or watchdog timer routine will execute each time that the time slot (physical channel) is detected. By counting subsequent time slots and multiframe bursts, the in-band translator is able to recognize when a specific time slot is capable of supporting a RACCH burst from the mobile station, and accordingly can provide diversity at the appropriate time slot.

As a result, the in-band translator compensates for timing differences of RACCH bursts between randomly positioned mobile stations and the host BTS.

BRIEF DESCRIPTION OF THE DRAWINGS

For a more complete understanding of the invention and its novel advantages and features, reference should be made to the accompanying drawings in which.

DETAILED DESCRIPTION OF A PREFERRED EMBODIMENT

Figure 1:
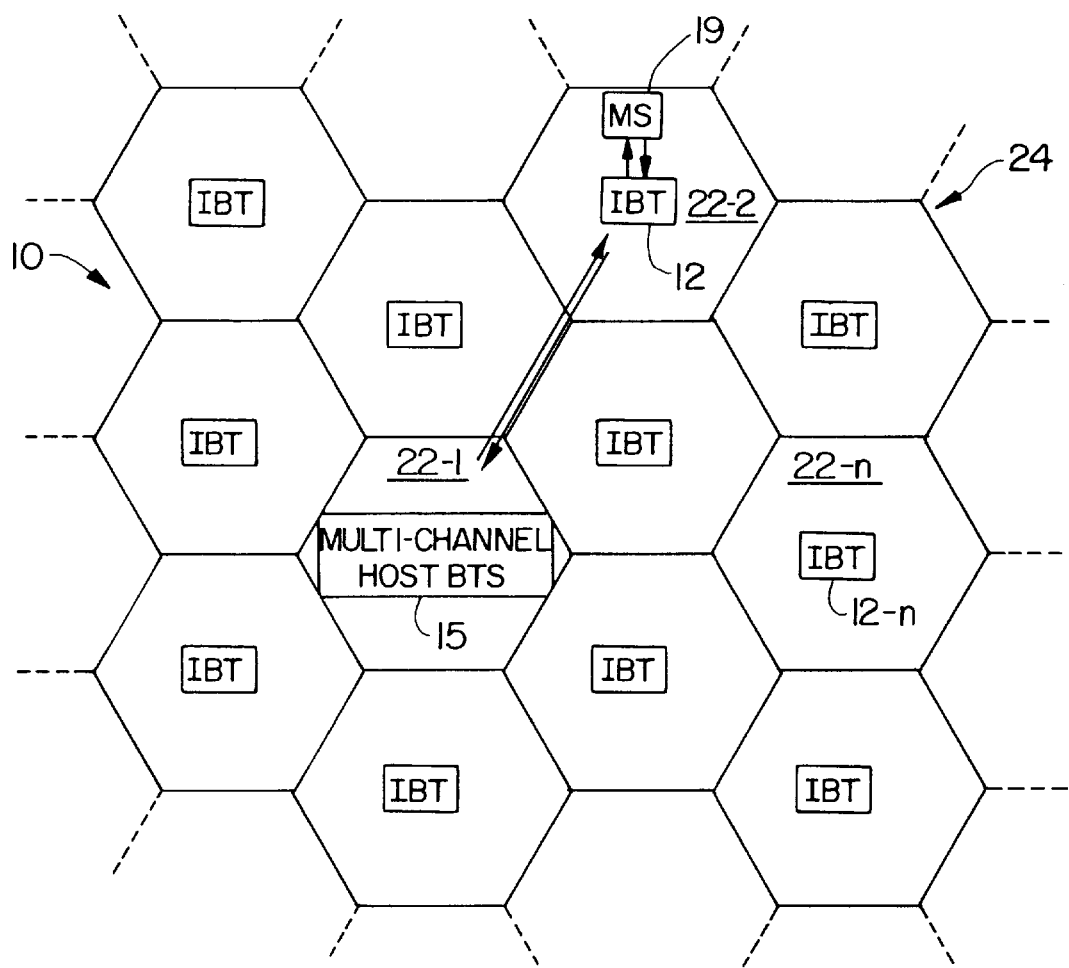
FIG. 1 is a view of a cell site cluster showing how a host Base Transceiver System (BTS), in-band translators, and mobile stations are deployed according to the invention.

FIG. 1 illustrates a wireless communication system 10 such as a Cellular Mobile Telephone, Personal Communication System (PCS), or similar system in which a system employing delay elements in multiple diversity paths of a wireless system repeater translator to allow for selective diversity and automatic level control which, according to the invention, enables proper demodulation at the BTS of signals received from in-band frequency translating-repeater remote base stations deployed in peripheral cells.

The system 10 provides voice and or data communication between mobile stations 19 and a Public Switched Telephone Network (PSTN) via radio signals. In the particular embodiment of the invention being described, the radio signaling protocol, or "air interface," uses a Time Division Multiple Access (TDMA) technique such as the PCS-1900 standard promulgated by the Telecommunications Industry Association (TIA) in the United States [which is identical in relevant aspects to the Global System for Mobile Communication (GSM) standard promulgated in Europe and elsewhere by the European Telecommunication Standards Institute (ETSI)].

The in-band translators 12-1, 12-2, . . . , 12-n (also referred to herein as the "remote base stations") are each located in what is normally to be approximately the center of a cell site 22 among a group or cluster 24 of cells. The in-band translators 12 receive radio signals from the mobile stations 20 located in their respective cells 22 and forward these signals to the associated host Base Transceiver System (BTS) 15. Likewise, radio signals originating at the host BTS 15 are forwarded by the translators 12 to the mobile stations 20. As a result, the signals associated with all of the mobile stations 20 located within the cluster 24 of cells 22-1, . . . , 22-n are thereby processed at the host BTS 15.

The in-band translators 12 are configured as "base stations" in the sense that they are each associated with a particular cell 22 and in that they each receive and transmit multiple signals from and to the mobile stations 20. However, the in-band translators 12 do not perform demodulation and modulation functions as does a conventional base station radio. Rather, they serve only to perform an in-band frequency-translation and amplification on signals received from the mobile stations 20 and then direct such signals on a different frequency to the host BTS 15. The in-band translators 12 also perform the inverse function, to frequency translate signals received from the host BTS 15-1 and then direct them to the mobile stations 20. The specific manner of translation will be discussed below in connection with FIG. 3.

Figure 2:
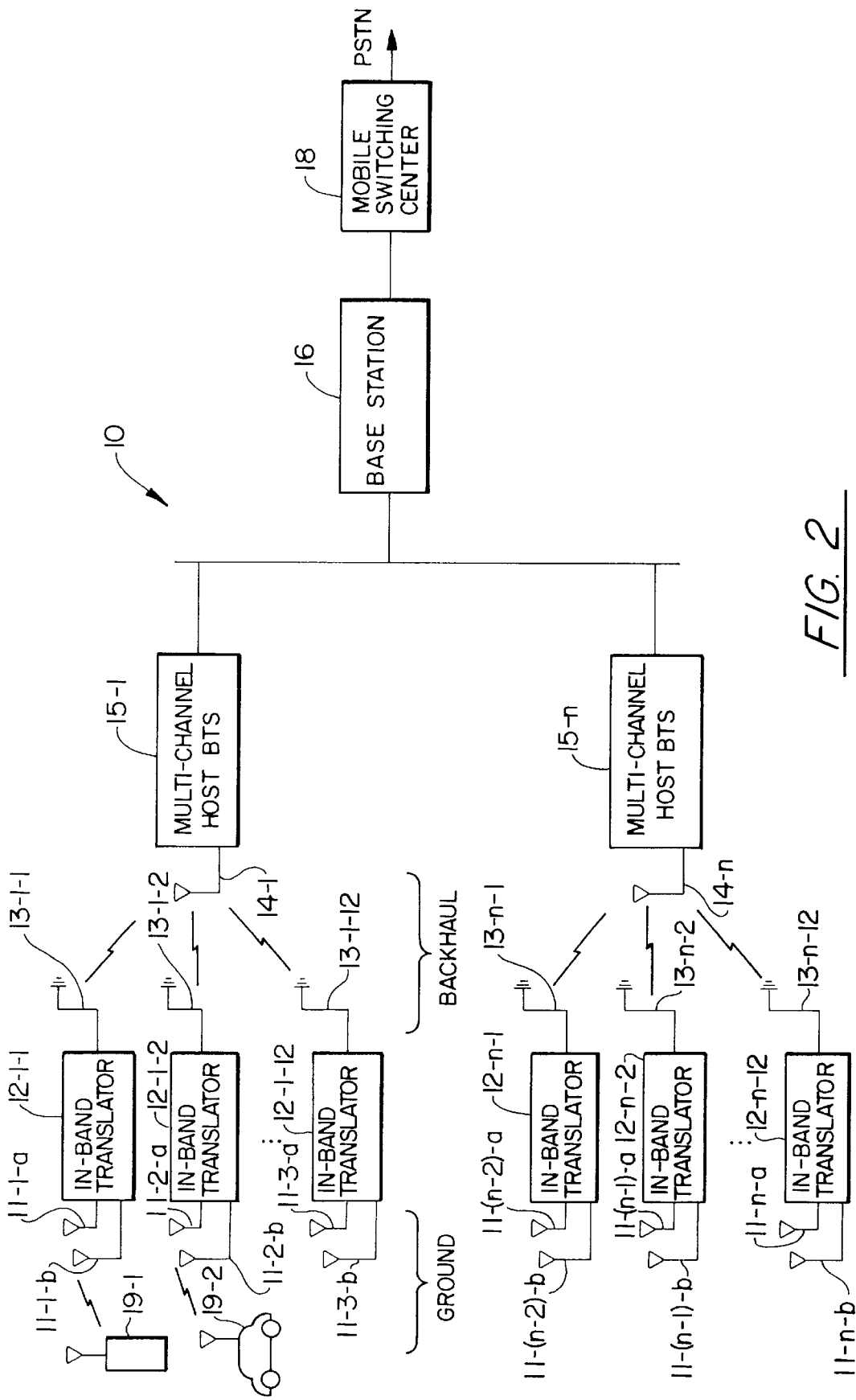
FIG. 2 is a block diagram of the components of the system.

Turning attention now to FIG. 2, the system 10 more particularly includes pairs of translator omni-directional antennas 11-1-a and 11-1-b, . . . , 11-(n-2)-a and 11-(n-2)-b, 11-(n-1)-a and 11-(n-1)-b, 11-n-a and 11-n-b (collectively, the omni-directional antennas 11), in-band translating repeaters (remote base stations) 12-1-1, . . . , 12-n-1, . . . , 12-n-12, translating repeater directional antennas 13-1, . . . , 13-n, host base station antennas 14-1, . . . , 14-n, multicarrier host Base Transceiver Systems (BTSS) 15-1, . . . 15-n, one or more base station controllers 16, a mobile switching center 18, and mobile stations 20-1, 20-2.

The host BTSs 15-1, . . . , 15-n are responsible for demodulating radio signals as well as for connecting such signals to the Public Switched Telephone Network (PSTN) through the mobile exchange 17. The host BTSs 15-1, . . . , 15-n also modulate signals received from the PSTN through the mobile switching center 18 to format them for transmission over the air through the in-band translators 12. A particular host BTS 15-1 serves the multiple in-band translators 12-1-1, 12-1-2, . . . , 12-1-n associated with a given cluster 24 of cells 22.

The Base Station Controller (BSC) 16, of which there may be more than one, has a number of functions. The primary function is to manage the logical connections made between mobile stations 20 and the PSTN. In order to do so, the Base Station Controller 16 assigns transmit and receive radio carrier frequencies to each individual mobile station 20, in-band translator 12, and host BTS 15. Typically, there may be five to twenty BTSs 15-1, . . . , 15-n serviced by a single Base Station Controller 16.

A United States patent entitled "Transceiver Apparatus Employing Wideband FFT Channelizer with Output Sample Timing Adjustment and Inverse FFT Combiner for a Multicarrier Communication Network" issued Jul. 16, 1996 and which is assigned to AirNet Communications Corporation, the assignee of this application, describes the details of several embodiments of the multicarrier BTS 15.

Figure 3:
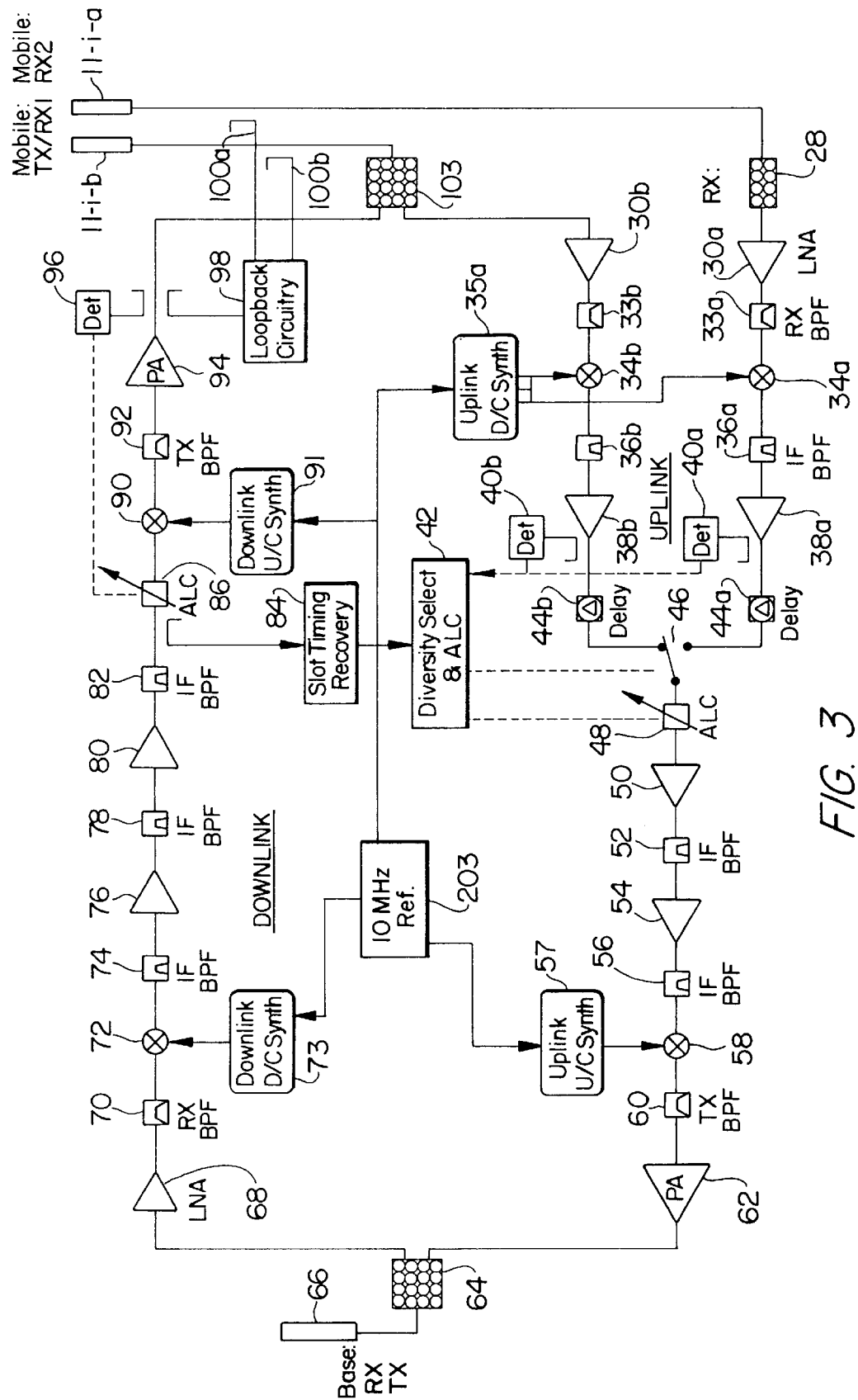
FIG. 3 is a detailed block diagram of one of the translators used in a PCS-1900 system.

FIG. 3 is a detailed block diagram of components of an exemplary translator 12. The translator 12 shifts the carrier frequency of the signals received from one link to the appropriate transmit frequency for the other link. The illustrated translator 12 also acts as a type of spatial to frequency diversity converter for the uplink direction as has already been mentioned. In particular, because no signal uses a radio frequency which is in use in the same cell for more than one type of link, the translator 12 may take advantage of spatial diversity reception on the backhaul link and use frequency diversity to maintain the information over the backhaul link. This is unlike prior art systems that use repeaters that do not preserve diversity information.

The translator 12 consists of translated signals received from the mobile link by the pair of diversity antennas 11-i-a, 11-i-b. A separate receive filter 28 and the receive portion of a duplexer 103 provide a portion of the receive signal to a pair of intermediate frequency (IF) signal processing chains consisting of a pair of low noise amplifiers (LNA) 30a, 30b, receiver band-pass filter 33a, 33b that limits the received energy to the desired radio frequency (RF) band such as the PCS 1900 uplink band allocated from 1850 to 1910 MHz. The mixers 34a, 34b which are driven by a first downconvert synthesizer 35a, and IF band pass filters 36a, 36b, and intermediate frequency low noise amplifiers 38a, 38b, comprise an IF stage. First downconvert synthesizer 35a and other synthesizers in the translator 12 are phase-locked to a common 10 MHz reference 203. The IF center frequency is typically chosen to be approximately 100 MHz, with a 300 KHz channel bandwidth associated with the IF bandpass filters, when using GSM-type waveforms.

Detectors 40a, 40b measure the power of the filtered channel of the radio frequency energy of the two signals provided by the low noise amplifiers 38a, 38b, which are in turn fed to the diversity select and automatic level control (ALC) computer 42. ALC computer 42 compares the instantaneous power level of the two signals fed to it by detectors 40a and 40b. Surface acoustic wave delay elements delay the transmitted diversity signals from both low noise amplifiers 38a and 38b while the instantaneous power levels are compared. ALC computer 42 selects the diversity signal with the higher power level and controls the operation of switch 46 so as to transmit the higher energy diversity signal to ALC amplifier 48.

Intermediate frequency bandpass filters 52 and 56 limit transmitted energy to the desired signal channel, after receiving the signal from amplifiers 50 and 54 respectively. At this point, uplink upconvert synthesizer 57 drives the mixer 58 by heterodyning the signal supplied to it with synthesizer local oscillator 35a, which is phase-locked to 10 MHz reference 203. Transmit bandpass filter 60 limits transmitted energy to the desired RF range and power amplifier 62 provides the output signal to duplexer 64 which transmits the signal to directional transmit/receive antenna 66.

In the backhaul to mobile (downlink) direction, the signal is first received on the directional transmit/receive antenna 66 from the home base station and forwarded to the duplexer 64. In this direction area only a single signal chain is needed. The RF signal output provided by the duplexer 64 is passed to a low noise amplifier 68, receive bandpass filter 70, and mixer 72, which is heterodyned by downlink downconvert synthesizer 73, which is phase-locked to 10 MHz reference 203. Intermediate frequency bandpass filter 74 provides the first limitation of the signal frequency of the downlink signal. In a manner similar to the uplink path, intermediate frequency bandpass filters 78 and 82 additionally limit transmitted energy to the desired range, after receiving the signal from amplifiers 76 and 80 respectively. Slot timing recovery circuit 84 accepts as an input the output of the IF band pass filter 82 in the downlink signal path. The slot timing recovery circuit 84 is necessary in a GSM-type system such as a PCS 1900 system in that the channel signals are Time Division Multiple Access (TDMA) type signals having a digital time division multiplex modulation. The modulation is such that eight individual multiplexed baseband signals are modulated onto a single given radio carrier frequency signal. Each of the eight TDMA signals typically originates from a different one of the mobile stations 20. In turn, each of the individual mobile stations 20 is typically located in a different portion of the cell 22. As such, a diversity decision must be made independently for each time slot because fading characteristics due to interference between direct and reflected RF signal paths depends upon the distance between each respective mobile station 20 and the in-band translator 12.

The slot timing recovery circuit 84 operates by taking advantage of the fact that a PCS 1900 signal waveform may be digitally modulated such that the signal power ramps up over a leading rise time and ramps down over a trailing fall time in each time slot. The power ramping in each time slot burst can be detected by the slot timing recovery circuit using an envelope detector to drive a phase lock loop.

The timing signal output by the downlink slot timing recovery circuit 84 then is used to trigger diversity selection and automatic level control in the uplink path through the diversity selection and automatic level control circuits in diversity selection and ALC computer 42. Particularly, once a slot timing signal is recovered from the downlink signal, it is fed to uplink diversity selection and automatic level control circuit 42 which drives the control input of the switch 46, and the gain adjustment at the proper time.

The output of the intermediate frequency bandpass filter 82 is forwarded to the automatic level control amplifier 86, and automatic level control amplifier 86 feeds a RF mixer 90 driven by downlink upconvert synthesizer 91, which heterodynes the signal supplied to the mixer with synthsizer local oscillator 73. Downlink upconvert synthesizer 91, like all synthesizers in the in-band translator 12, is phase-locked to the 10 MHz reference 203. Transmit bandpass filter 92 limits the signal to the transmit band, in this case, being 1930–1990 MHz. The output of transmit bandpass filter 92 is in turn fed to the power amplifier 94 prior to being fed to the transmit portion of the duplexer 103, ultimately out to the antenna 11-1-b. A detector 96 monitors the transmit energy output of the power amplifier for the automatic level control amplifier 86. The loopback circuitry 98, which couples and downconverts the downlink energy output into the uplink receive paths from antennae 11-i-a and 11-i-b through couplers 100a and 100b respectively.

Typically, class AB linear amplifiers are used throughout the translator 12 in both the forward and reverse paths and the translator 12 is typically implemented with software programmable synthesizers so that the channel settings deployed may be easily programmed during installation or system configuration.

The translator 12 is capable of receiving downlink signals at relatively low levels and then retransmitting them at high power levels to the mobile unit, with the automatic level control circuit typically designed to control the transmitted forward path signal typically within a range of 20–40 Watts.

In the uplink path, that is from the mobile to the base station, the translator 12 is designed to receive a low-level signal from its omni-directional antennas 11-i-a, 11-i-b and to retransmit the signal to the base transceiver system 15 with up to approximately 125 dB of signal gain and typical power of 1 Watt over the directional antenna 66.

As a result, the stronger of two uplink mobile transmit diversity channels are continuously transmitted back to the base transceiver system on one backhaul frequency that minimizes backhaul frequency use. The net effect is that even with a deployment of these "range extending" translators 12, both the receive and transmit signal performance expected is as effective against multi-path fading and noise as deploying a standard base transceiver system in each of the home base station sites.

While we have shown and described several embodiments in accordance with the present invention, it is to be understood that the invention is not limited thereto, but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. In a cellular communication system comprising a plurality of cells, the plurality of cells being located substantially adjacent one another, and the cellular communication system operating over a specified frequency range, the cellular communication system making use of a frequency allocation plan that arranges the cells into clusters wherein only one of said cells within said cluster contains a broadband base transmitter station, the cellular communication system comprising:

an in-band translator apparatus located in each of said cluster of cells not containing said broadband base transmitter station, wherein said in-band translator apparatus employs delay elements to implement selective spatial diversity on a slot-by-slot basis.

2. A cellular telecommunications system as in claim 1, where said in-band translator apparatus employs delay elements to implement automatic level control.

3. A cellular telecommunications system as in claim 2, where said automatic level control is implemented in a predictive feedforward fashion.

4. A cellular communication system comprising a plurality of cells, the plurality of cells being located substantially adjacent one another, and the cellular communication system operating over a specified frequency range, the cellular communication system making use of a frequency allocation plan that arranges the cells into clusters, the system comprising:

a home base station including a multicarrier broadband base transceiver system for receiving and transmitting multiple radio signals on multiple respective carrier frequencies, including a demodulator for demodulating said received radio signals and for coupling demodulated signals to a switching means, and means for modulating signals received from the switching means and coupling them for radio transmission on the multiple carrier frequencies;

a plurality of in-band translator means, each of said plurality of in-band translator means located in a respective one of said plurality of cells in the cluster, each of said plurality of in-band translator means further including:

first translator means for receiving a first uplink signal from a mobile station located in the respective one of said plurality of cells and translating a carrier frequency of said first uplink signal to a first divergent carrier frequency within the specified radio frequency range to produce a first backhaul signal, said first translator means further including first delay means for receiving and delaying said first backhaul signal;

second translator means for receiving a second uplink signal from said mobile base station means and translating a carrier frequency of said second uplink signal to a second divergent carrier frequency within the specified radio frequency range, to produce a second backhaul signal, said second translator means further including second delay means for receiving and delaying said second backhaul signal, detection means for determining the instantaneous power level of said first backhaul signal and the instantaneous power level of said second backhaul signal, comparison means for comparing the instantaneous power level of said first backhaul signal to the instantaneous power level of said second backhaul signal, selection means for selecting the one of said first divergent carrier frequency and said second divergent carrier frequency having the highest instantaneous power level, and then connecting said backhaul signal for transmission to the home base station means using said selected one of said first divergent carrier frequency and said second divergent carrier frequency having the highest instantaneous power level.

5. A cellular telecommunications system as in claim 4, where said second uplink signal received by said second translator means is spatially diverse from said first uplink signal.

6. A cellular telecommunications in-band translator comprising:

first translator means for receiving a first uplink signal from a mobile station located in the cell served by said in-band translator and translating a carrier frequency of said first uplink signal to a first divergent carrier frequency to produce a first backhaul signal, said first translator means further including first delay means for receiving and delaying said first backhaul signal, second translator means for receiving a second uplink signal from said mobile base station and translating a carrier frequency of said second uplink signal to a second divergent carrier frequency to produce a second backhaul signal, said second translator means further including second delay means for receiving and delaying said second backhaul signal, detection means for determining the instantaneous power level of said first backhaul signal and the instantaneous power level of said second backhaul signal, comparison means for comparing the instantaneous power level of said first backhaul signal to the instantaneous power level of said second backhaul signal, selection means for selecting the one of said first divergent carrier frequency and said second divergent carrier frequency having the highest instantaneous power level, and then connecting said backhaul signal for transmission to the home base station means using said selected one of said first divergent carrier frequency and said second divergent carrier frequency having the highest instantaneous power level; and attenuation means for implementing automatic level control of said selected divergent carrier frequency signal to provide constant backhaul transmit power on a slot-by-slot basis for a GSM/TDMA waveform.

7. The cellular telecommunications in-band translator of claim 6, wherein said attenuation means implements automatic level control of said selected divergent carrier frequency signal based on the detected level of said selected divergent carrier frequency signal.

* * * * *